H. DECH.
INNER TUBE AND METHOD OF MAKING THE SAME.
APPLICATION FILED AUG. 14, 1918.
1,340,704.   Patented May 18, 1920.
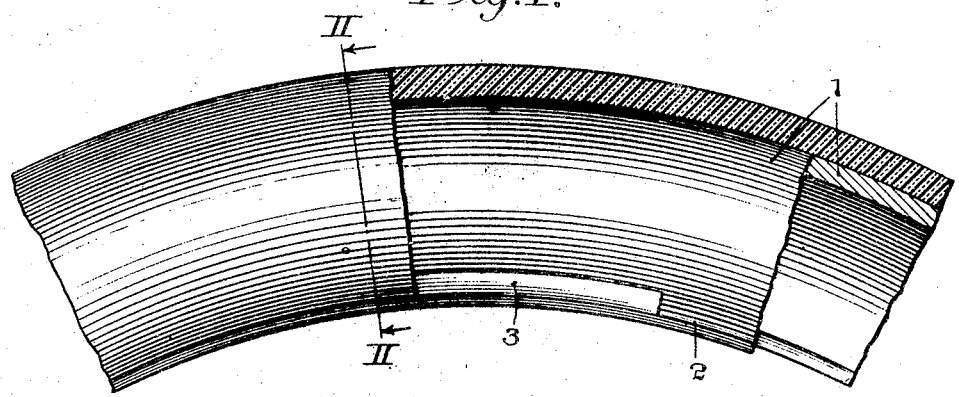
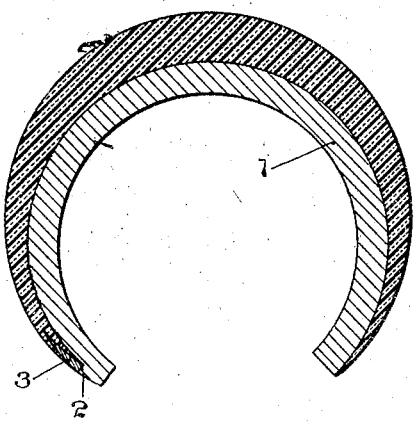   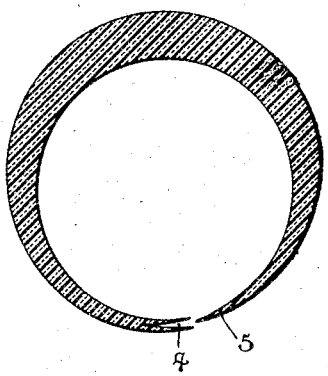
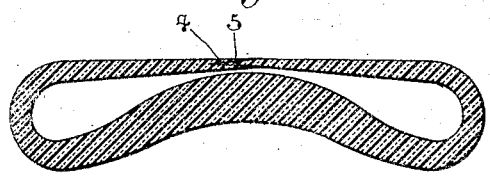
Inventor:
Henry Dech

UNITED STATES PATENT OFFICE.

HENRY DECH, OF TRENTON, NEW JERSEY, ASSIGNOR TO MERCER TIRE COMPANY, OF TRENTON, NEW JERSEY, A CORPORATION OF NEW JERSEY.

INNER TUBE AND METHOD OF MAKING THE SAME.

1,340,704.  Specification of Letters Patent.  Patented May 18, 1920.

Application filed August 14, 1918. Serial No. 249,810.

*To all whom it may concern:*

Be it known that I, HENRY DECH, a citizen of the United States, and resident of Trenton, in the county of Mercer and State of New Jersey, have invented a new and useful Improvement in Inner Tubes and Methods of Making the Same, of which the following is a specification.

This invention relates to a rubber inner tube for pneumatic vehicle tires and to a method for the manufacture of the same, with the particular object in view of providing an inner tube which can have any desired reinforcement or thickness as to its tread portion or outer periphery.

Another object consists in providing a method whereby tubes of such character may be expeditiously manufactured and the material of which the tube is composed vulcanized in substantially the same shape as that in which it is to be used.

Up to the present time it has been the general custom to manufacture inner tubes for pneumatic vehicle tires on either straight or spiral cores or mandrels. These tubes are commonly very thin and of a uniform thickness throughout. They serve as air-tight containers for the air which gives the tire its pneumatic character, and their rupture by direct puncture or by abrasion, results in the deflation of the tire as a whole. It has been found that one of the most frequent causes of deflation is the cracking or breaking of the fabric which constitutes the inside of the outer shoe or casing, which cracking or breaking raises a ridge which gradually chafes through the comparatively thin inner tube.

Furthermore, any small, sharp article which manages to penetrate the outer shoe or casing of the tire will rapidly wear through the ordinary tube, and when even a small hole is formed in the casing, the air pressure within the tube will force the wall of the inner tube therethrough and burst it. To obviate these disadvantages it has been suggested to either reinforce the outer portion of the tube with metal, fabric, etc., or to make that portion of the tube relatively thick. These suggestions have been found to be impractical when the tubes were made on straight or spiral mandrels and by methods now in common use.

My invention overcomes the difficulties mentioned and enables the rapid and satisfactory manufacture of inner tubes with thickened tread portions reinforced in any desired and practical manner to withstand wear.

A practical embodiment of my invention and of one form of apparatus which is adapted for carrying out my improved method is shown in the accompanying drawings in which:

Figure 1 represents a side elevation, partly broken away, of a portion of the core or mandrel on which the tube is built and vulcanized, the tube being shown in position thereon.

Fig. 2 represents an enlarged section taken in the plane of the line II—II of Fig. 1 looking in the direction of the arrows.

Fig. 3 represents an enlarged cross section of the vulcanized tube before its edges are joined, and Fig. 4 represents an enlarged cross section through a modified form of tube.

The core 1 on which the tube is built up is in the form of an open bellied annulus or ring one side of which is slightly longer in a radial direction than the other. The outer surface of the longer side of the core 1 is cut away gradually from a point about the middle of the side to a point near the edge thereof to form an abrupt shoulder 2 near the edge of the said side. A wedge-shaped molding ring 3 is fitted to seat on the shoulder 2.

The tube is now built up on the core of materials well known to those skilled in the art and in such a manner that the ring 3 will form in one of its edges a slit 4 having flaring sides, while the other edge 5 is formed with a taper corresponding to the flare of the slit 4.

The tube is then wound spirally with fabric and vulcanized in a manner well known to those skilled in the art. After the vulcanization is finished, the fabric is removed, the tube stripped from the core and the ring 3 withdrawn from the edge of the tube. If desired, the ring 3 may be coated with some substance, such as talc, to prevent it from adhering to the tube as a result of the vulcanization. Quick vulcanizing rubber cement is now applied to the tapered edge 5 or to the slit 4, and the former is inserted into the latter. The joint thus formed is then subjected to vulcanizing heat for a period sufficient to cure the cement, and thus the edges of the tube are securely and permanently fastened together and the tube made air-tight. Before this vulcanizing step takes place, the tube may be lightly inflated, say to about ten pounds air pressure, if desired.

A suitable valve may be built into the tube in a manner which is well understood by those skilled in the art.

The tube is now complete and may be used in the ordinary manner.

If it is desired to make my tube practically self-healing as against ordinary punctures, the tube may immediately after vulcanization be turned inside out before the edges are permanently joined, as shown in Fig. 4. This reversing will produce a pronounced lateral compression of the tread or thickened portion of the tube, and particularly of the inner portion of the tread, which will be sufficient to make the tube self-sealing after an ordinary puncture by a small object.

It will be observed that by the above method the tube is completely built and vulcanized in substantially the shape in which it is to be used and that the uniting of the edges of the tube, except in the modified form shown in Fig. 4, does not require any appreciable distortion of the tread portion or walls.

It will be seen that the tube may be made of any desired thickness and may be reinforced with any suitable or convenient materials for the purpose of strengthening it.

I desire it to be understood that various changes may be resorted to in the form, construction and arrangement of the tube and of the apparatus used in carrying out the method of manufacturing it, and in the particular manner of conducting the steps of the method and in the order thereof, without departing from the spirit and scope of my invention; and hence I do not intend to be limited to the details herein shown and described except as they are specifically included in the claims.

What I claim is:

1. Method of making an inner tube comprising the following steps: first, building up on a suitable core an open bellied tube having one of its edges reduced in size and a slit in its other edge to receive the reduced edge; second, vulcanizing the tube; third, removing the tube from the core, and finally sealing the tube by inserting the reduced edge of the tube into the slit in the other edge.

2. Method of making an inner tube comprising the following steps: first, building up on a suitable core an open bellied tube having one of its edges reduced in size and a slit in its other edge to receive the reduced edge; second, vulcanizing the tube; third, removing the tube from the core; fourth, turning the tube inside out; and finally, sealing the tube by inserting the reduced edge of the tube into the slit in the other edge.

3. An inner tube having a relatively thick tread portion and a permanent annular joint in its inner periphery, the said joint being formed by a reduced taper edge of the tube blank seated and sealed within a corresponding slit in the other edge of the tube blank.

In testimony that I claim the foregoing as my invention I have signed my name this 24th day of July, 1918.

HENRY DECH.